(12) United States Patent
Liu

(10) Patent No.: US 12,381,970 B2
(45) Date of Patent: Aug. 5, 2025

(54) MAGNETIC TYPE MOBILE PHONE HOLDER

(71) Applicant: Shenzhen Sodi Innovation Technologies Co., Ltd., Shenzhen (CN)

(72) Inventor: Yuelian Liu, Shantou (CN)

(73) Assignee: Shenzhen Sodi Innovation Technologies Co., Ltd., Shenzhen (CN)

( * ) Notice: Subject to any disclaimer, the term of this patent is extended or adjusted under 35 U.S.C. 154(b) by 343 days.

(21) Appl. No.: 18/319,905

(22) Filed: May 18, 2023

(65) Prior Publication Data

US 2023/0291822 A1   Sep. 14, 2023

(30) Foreign Application Priority Data

May 6, 2023   (CN) .......................... 202321072287.X

(51) Int. Cl.
*H04M 1/04* (2006.01)
*G06F 1/16* (2006.01)
*H04M 1/02* (2006.01)

(52) U.S. Cl.
CPC ............ *H04M 1/04* (2013.01); *G06F 1/1632* (2013.01); *G06F 1/1686* (2013.01); *H04M 1/0264* (2013.01); *H04M 1/0266* (2013.01)

(58) Field of Classification Search
CPC .. G06F 1/1632; G06F 1/1685; H04M 1/0266; H04M 1/0264; H04M 1/04
See application file for complete search history.

(56) References Cited

U.S. PATENT DOCUMENTS

| 7,374,142 | B2 * | 5/2008 | Carnevali | .............. F16M 13/00 |
| | | | | 224/183 |
| 7,398,952 | B2 * | 7/2008 | Carnevali | .............. F16M 11/28 |
| | | | | 248/404 |
| 8,602,376 | B2 * | 12/2013 | Vogel | ....................... F16B 1/00 |
| | | | | 248/371 |

(Continued)

FOREIGN PATENT DOCUMENTS

| CN | 219107068 U | * | 5/2023 | |
| CN | 220974075 U | * | 5/2024 | |
| FR | 3154275 A3 | * | 4/2025 | ........... F16M 11/041 |

OTHER PUBLICATIONS

SODI, SODI Continuity Camera Mount, Apr. 7, 2023, Amazon. com, https://www.amazon.com/SODI-Continuity-Camera-Desktop-Monitor/dp/B0C1RHB3NQ/ (Year: 2023).*

(Continued)

*Primary Examiner* — Patrick F Marinelli
(74) *Attorney, Agent, or Firm* — Hemisphere Law, PLLC; Zhigang Ma

(57) ABSTRACT

A novel magnetic type mobile phone holder is provided, including a base, wherein a balancing weight is arranged in the base; a lower holder, wherein one end of the lower holder is in rotatable fit with the base; a first abutment portion is arranged on the lower holder; the first abutment portion can cooperate with the base to fix the mobile phone holder to display equipment; an upper holder, wherein the upper holder is in rotatable fit with one side of the lower holder away from the base; and a magnetic disk holder, wherein the magnetic disk holder is detachably fitted to one side of the upper holder away from the lower holder.

9 Claims, 12 Drawing Sheets

(56) References Cited

U.S. PATENT DOCUMENTS

| | | | | |
|---|---|---|---|---|
| 8,613,379 | B2* | 12/2013 | Lee | B62J 50/225 |
| | | | | 224/558 |
| 8,870,146 | B2* | 10/2014 | Vogel | F16M 13/00 |
| | | | | 248/371 |
| 9,611,881 | B2* | 4/2017 | Khodapanah | F16B 21/06 |
| D818,421 | S* | 5/2018 | Hu | D12/415 |
| 10,066,779 | B2* | 9/2018 | Vogel | F16M 13/00 |
| 10,192,665 | B2* | 1/2019 | Breiwa | G06F 1/1632 |
| 10,491,727 | B1* | 11/2019 | Liu | H04M 1/04 |
| 10,554,799 | B2* | 2/2020 | Lee | H04B 1/3888 |
| 10,736,407 | B1* | 8/2020 | Jin | A45F 5/02 |
| 10,946,810 | B2* | 3/2021 | MacNeil | F16M 11/10 |
| 11,548,451 | B2* | 1/2023 | Jankura | H04M 1/04 |
| 11,585,485 | B2* | 2/2023 | Jankura | F16M 11/12 |
| D1,014,492 | S* | 2/2024 | Sun | D14/253 |
| 11,897,396 | B2* | 2/2024 | Jankura | B62J 11/00 |
| 11,985,264 | B1* | 5/2024 | Han | F16M 11/38 |
| D1,034,623 | S* | 7/2024 | Yang | D14/447 |
| 12,032,405 | B2* | 7/2024 | Ent | G06F 1/1656 |
| D1,050,107 | S* | 11/2024 | Ma | D14/253 |
| D1,052,575 | S* | 11/2024 | Sun | D14/253 |
| 12,228,238 | B2* | 2/2025 | Ferraris | F16M 11/041 |
| 12,241,583 | B2* | 3/2025 | Jankura | H04M 1/04 |
| D1,073,605 | S* | 5/2025 | Meng | D13/108 |
| D1,073,660 | S* | 5/2025 | Tian | D14/253 |
| D1,075,736 | S* | 5/2025 | Liu | D14/253 |
| D1,076,905 | S* | 5/2025 | Lan | D12/415 |
| D1,078,717 | S* | 6/2025 | Liu | D14/251 |
| 2006/0180726 | A1 | 8/2006 | Molinari | |
| 2008/0234013 | A1 | 9/2008 | Bury | |
| 2014/0354218 | A1* | 12/2014 | Kaynar | H01F 7/0252 |
| | | | | 320/107 |
| 2015/0189055 | A1* | 7/2015 | An | B60R 11/0241 |
| | | | | 455/573 |
| 2018/0202601 | A1* | 7/2018 | Kelly | H04M 1/04 |
| 2019/0195417 | A1* | 6/2019 | Kwasniewski | F16M 11/2064 |
| 2019/0230205 | A1* | 7/2019 | Lee | H04B 1/3888 |
| 2019/0371504 | A1* | 12/2019 | Breiwa | H02J 7/0042 |
| 2020/0237083 | A1* | 7/2020 | Jin | H04M 1/04 |
| 2021/0005368 | A1* | 1/2021 | Breiwa | F16M 13/022 |
| 2021/0026409 | A1* | 1/2021 | Miles | F16M 13/02 |
| 2021/0041057 | A1* | 2/2021 | Jankura | H04B 1/3888 |
| 2021/0367452 | A1* | 11/2021 | Nahum | H04B 1/3883 |
| 2022/0214010 | A1* | 7/2022 | Jankura | H04B 1/3888 |
| 2022/0228707 | A1* | 7/2022 | Ng | F16M 11/041 |
| 2023/0054404 | A1* | 2/2023 | Jankura | B60R 11/0241 |
| 2023/0072993 | A1* | 3/2023 | Kim | F16M 11/14 |
| 2023/0291822 | A1* | 9/2023 | Liu | G06F 1/1632 |
| 2023/0332739 | A1* | 10/2023 | Ma | H04M 1/04 |
| 2023/0418330 | A1* | 12/2023 | Ent | G06F 1/1626 |
| 2024/0308436 | A1* | 9/2024 | Yao | F16M 11/041 |
| 2024/0384829 | A1* | 11/2024 | Li | G03B 17/561 |
| 2024/0422253 | A1* | 12/2024 | Cai | G06F 3/1431 |
| 2025/0131994 | A1* | 4/2025 | Gross | G16H 20/00 |
| 2025/0137574 | A1* | 5/2025 | Werle | F16M 11/18 |
| 2025/0137581 | A1* | 5/2025 | Fan | F16M 11/126 |
| 2025/0189069 | A1* | 6/2025 | Lu | H04M 1/04 |

OTHER PUBLICATIONS

Stouchi, Stouchi Continuity Camera Mount, April 15th 20223, Amazon.com, https://www.amazon.com/Stouchi-Continuity-Compatible-Mag-Safe-Desktops/dp/B0BZP93WPY/ (Year: 2023).*

* cited by examiner

MAGNETIC TYPE MOBILE PHONE HOLDER

TECHNICAL FIELD

The present disclosure relates to the technical field of mobile phone holders, specifically to a novel magnetic type mobile phone.

BACKGROUND

A mobile phone holder is a holder used to support a digital product (such as a mobile phone and a tablet computer) just as its name implies. To make people comfortable and avoid people from suffering from cervical spondylosis, the mobile phone holder is mainly designed according to the ergonomics to provide users with a more comfortable way to use digital products.

There are two kinds of commonly used mobile phone holders on the market according to their fixing manners. One kind is a traditional gripper type mobile phone holder, which clamps a mobile phone in a telescopic clamping or swinging clamping manner to achieve fixation. Another kind is a magnetic type mobile phone holder, which designs a magnetic structure on an abutting surface or a portion close to the abutting surface of the mobile phone holder. When the mobile phone abuts against the abutting surface of the mobile phone holder, the magnetic structure in the mobile phone holder attracts a magnetic structure arranged in the mobile phone or a mobile phone protector or a magnetically attracted structure, thereby achieving an objective of fixing the mobile phone.

The existing magnetic type mobile phone holder is usually designed as one piece, that is, a holder body and a head portion used for being connected to the mobile phone are of an integrated structure. In this way, the magnetic type mobile phone holder can only be used as a whole holder. When the mobile phone needs to be used with a tablet computer, a laptop computer, or a desktop computer, it is difficult for the integrated magnetic type mobile phone holder to meet the demand. Therefore, the existing magnetic type mobile phone holder needs to be improved.

SUMMARY

The present disclosure aims to provide a novel magnetic mobile phone holder for the defects and shortcomings in the prior art. The novel magnetic mobile phone holder has the advantages of wide application range, reliable connection, and convenience in use.

In order to achieve the above objective, a technical solution adopted in the present disclosure is as follows: A novel magnetic type mobile phone holder includes a base, wherein a balancing weight is arranged in the base; a lower holder, wherein one end of the lower holder is in rotatable fit with the base; a first abutment portion is arranged on the lower holder; the first abutment portion can cooperate with the base to fix the mobile phone holder to display equipment; an upper holder, wherein the upper holder is in rotatable fit with one side of the lower holder away from the base; and a magnetic disk holder, wherein the magnetic disk holder is detachably fitted to one side of the upper holder away from the lower holder. When the magnetic disk holder is separated from the upper holder, the magnetic disk holder can be independently connected to the display equipment to connect a mobile phone fixed on the magnetic disk holder to the display equipment.

In one embodiment, the lower holder includes a first connecting section and a second connecting section connected to one side of the first connecting section away from the base; the first connecting section is perpendicular to the second connecting section; the first abutment portion is located at connection positions of the first connecting section and the second connecting section; the first abutment portion protrudes from the second connecting section and extends towards one side away from the upper holder; and the first abutment portion is perpendicular to the first connecting section.

In one embodiment, a first hinge portion is arranged at one end of the base; a second hinge portion is arranged on one side of the first connecting section away from the second connecting section; and the upper holder is in rotatable fit with the base through the first hinge portion and the second hinge portion.

In one embodiment, a hinge end socket is arranged on one side of the second connecting section away from the first connecting section; a hinge slot is formed in one side of the upper holder close to the second connecting section; and the hinge end socket is plugged into the hinge slot and is in rotatable fit through a first rotating shaft.

In one embodiment, the lower holder further includes a flexible protective member; the flexible protective member is connected to the first connecting section and is located between the first connecting section and an upper end surface of the base; and one side of the flexible protective member away from the second hinge portion is connected to the first abutment portion.

In one embodiment, an end surface of the magnetic disk holder connected to the mobile phone is a connecting end surface; and the magnetic disk holder includes:

an outer shell, wherein a bulge structure is arranged on one side of the outer shell away from the connecting end surface; the bulge structure extends towards one side away from the connecting end surface; a plugging port is formed in a side wall of the bulge structure; the display equipment is connected to the plugging port to achieve connection between the magnetic disk holder and the display equipment; and a magnetic piece, wherein the magnetic piece is mounted on one side, away from the bulge structure, in the outer shell.

In one embodiment, a connecting portion is arranged in the bulge structure; the connecting portion extends to one side of the magnetic piece; and the upper holder is threaded into the plugging port and is in detachable fit with the connecting portion.

In one embodiment, a plugging portion is arranged on one side of the upper holder close to the plugging port; a connecting slot matched with the connecting portion is formed in one side of the plugging portion close to the connecting portion; a recess is formed in a side wall of the connecting slot; a fixture block matched with the recess is arranged on an outer side wall of the connecting portion in a raised manner; and/or, a recess is formed in an outer side wall of the connecting portion, and a fixture block matched with the recess is arranged on a side wall of the connecting slot in a raised manner.

In one embodiment, an abutment portion is arranged on an end surface of the bulge structure located on one side of the plugging port; and the abutment portion is parallel to an attractive end surface of the magnetic disk holder.

The magnetic disk holder further includes: a supporting member, wherein the supporting member is accommodated in the outer shell; an annular slot is formed in one side of the supporting member away from the bulge structure; the magnetic piece is embedded in the annular slot; and an abutting sheet, wherein the abutting sheet is located on an attractive side of the magnetic piece and is connected to the magnetic piece.

After the adoption of the above technical solution, the present disclosure has the beneficial effects that: During use, the mobile phone holder can be hung on the display equipment. The first abutment portion arranged on the lower holder abuts against one end surface of the display equipment. The balancing weight inside the base leans against the other end surface of the display equipment. The lower holder is forced to press against a side wall of the display equipment under the gravity of the balancing weight, so that the first abutment portion resists against the end surface of the display equipment for fixation, thereby achieving the combination between the mobile phone holder and the display equipment. If it is necessary to fix the mobile phone on a notebook computer display screen or a tablet, the magnetic disk holder is removed from the upper holder, and the plugging port is clipped into a thickness end surface of the notebook computer display screen or the tablet. Under the action of the gravities of the magnetic disk holder and the mobile phone, the abutment port resists against the end surface of the notebook computer display screen or the tablet, and the outer shell resists against the other end surface of the notebook computer display screen or the tablet, thereby achieving combination between the magnetic disk holder and the notebook computer display screen or the tablet. The mobile phone holder set in this way can realize a basic function of the mobile phone holder, and can also fix the mobile phone on the display equipment for use with the display equipment through the first abutment portion and the abutment portion. On the one hand, use scenes and use ways of the magnetic type mobile phone holder are added, demands of users are greatly met, and the application range and the convenience of use of the magnetic type mobile phone holder are improved. On the other hand, the reliability of combination between the magnetic disk holder and the display screen can be effectively guaranteed.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. Obviously, the drawings in the illustration below are only some embodiments of the present disclosure. Those ordinarily skilled in the art also can acquire other drawings according to the provided drawings without doing creative work.

DETAILED DESCRIPTION OF THE EMBODIMENTS

The present disclosure is further described in detail below in combination with accompanying drawings.

This specific embodiment is only an explanation of the present disclosure, and it is not a limitation to the present disclosure. After reading this specification, those skilled in the art can make modifications to this embodiment that do not create any contribution as needed, but the modifications shall be protected by the patent law within the scope of the claims of the present disclosure.

Figure 1:
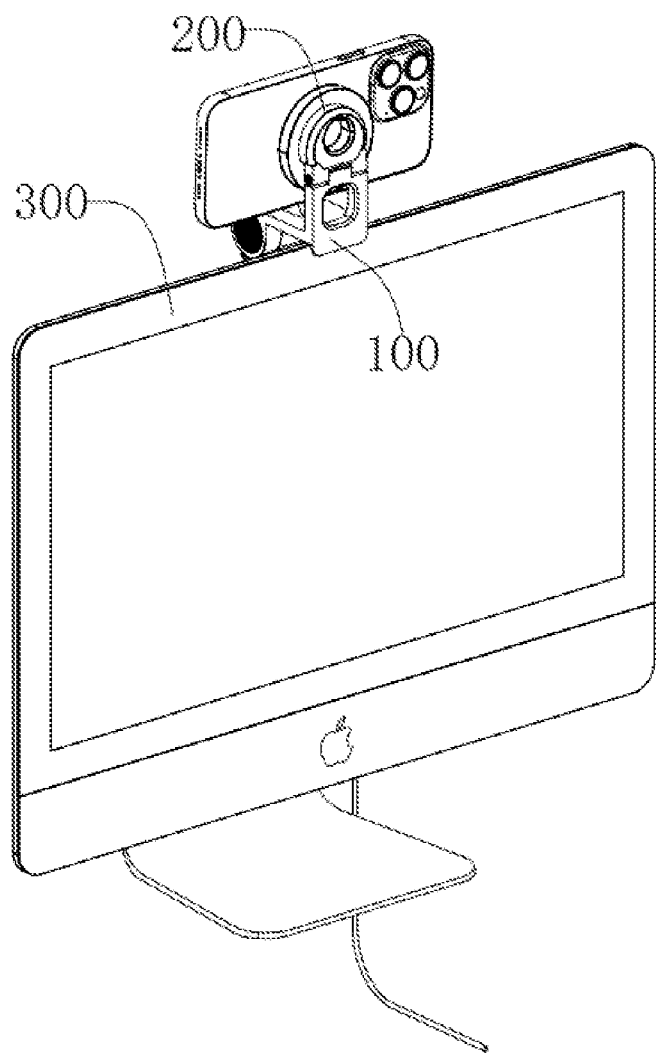
FIG. 1 is a schematic structural diagram of combination between a magnetic type mobile phone holder and a display screen of Apple iMac in one embodiment.
Figure 2:
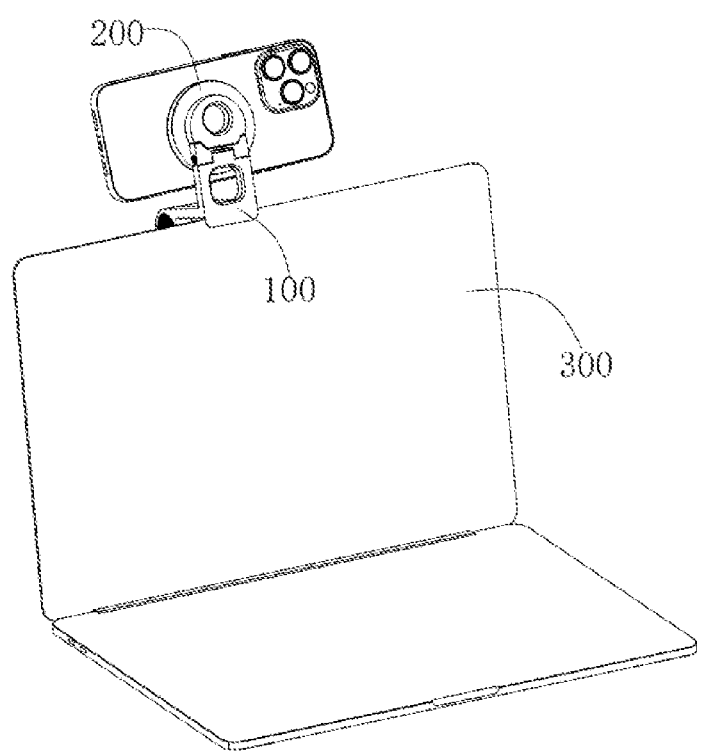
FIG. 2 is a schematic structural diagram of combination between a magnetic type mobile phone holder and a display screen of Apple macbook in one embodiment.

Referring to FIG. 1 and FIG. 2, this embodiment mainly relates to a novel magnetic type mobile phone holder, which can not only realize a basic function of the mobile phone holder, but also combine a mobile phone with display equipment 300 to facilitate users to use the mobile phone to take pictures while using the display equipment 300. It should be noted that the display equipment 300 includes but is not limited to a desktop computer display, a notebook computer display screen, a tablet, a television set, and the like. In this embodiment, an Apple series product is used for explanation.

It should also be noted that the magnetic type mobile phone holder of this embodiment is mainly suitable for iPhone 12, iPhone 13, iPhone 14, and other Apple series mobile phones with magnetic blocks inside. Of course, this magnetic type mobile phone holder is also applicable to other mobile phones with magnetic blocks or magnetic metal blocks inside. For mobile phones that do not have magnetic blocks or magnetic metal blocks inside, external magnetic blocks or external magnetic metal blocks can be fixed to the mobile phones by pasting, covering, and in other ways, and the mobile phones are then used in conjunction with the magnetic type mobile phone holder. Obviously, the magnetic metal blocks are metal blocks that can be attracted by magnets.

Figure 3:
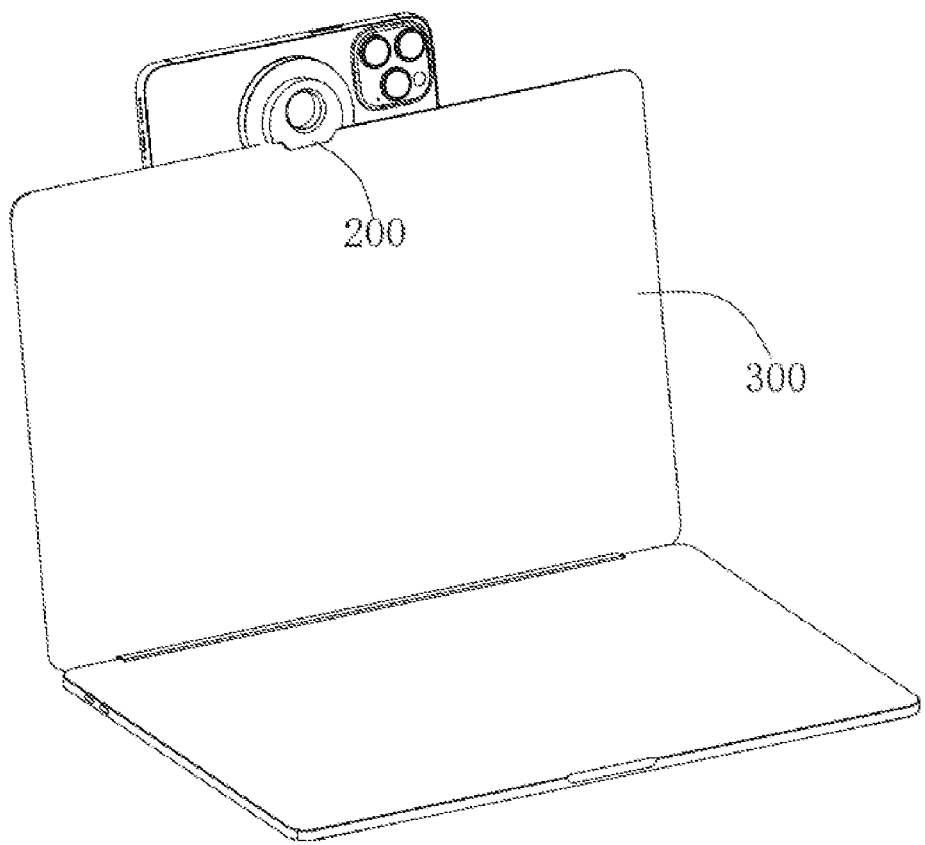
FIG. 3 is a schematic structural diagram of combination between a magnetic disk holder and a display screen of Apple macbook in one embodiment.

Continue to refer to FIG. 1 and FIG. 2, the magnetic type mobile phone holder includes a main body holder 100 and a magnetic disk holder 200 detachably fitted with the main body holder 100. The magnetic disk holder 200 attracts a magnetic block or a magnetic metal block in a mobile phone or attracts a magnetic block or a magnetic metal block attached to a mobile phone housing in another connecting manner, so as to fix the mobile phone. As shown in FIG. 3, the magnetic disk holder 200 after removal can be assembled with the display equipment 300, thereby combining the mobile phone fixed on the magnetic disk holder 200 with the display equipment 300.

In one embodiment, in the process of connecting the mobile phone to the display equipment 300 through the magnetic disk holder 200, the mobile phone can also be connected to the display equipment 300 in a wired or wireless manner, thereby achieving interconnection between the mobile phone and the display equipment 300. The wired or wireless connection includes but is not limited to Bluetooth connection, Internet of Things connection, and screen projection connection.

Figure 4:
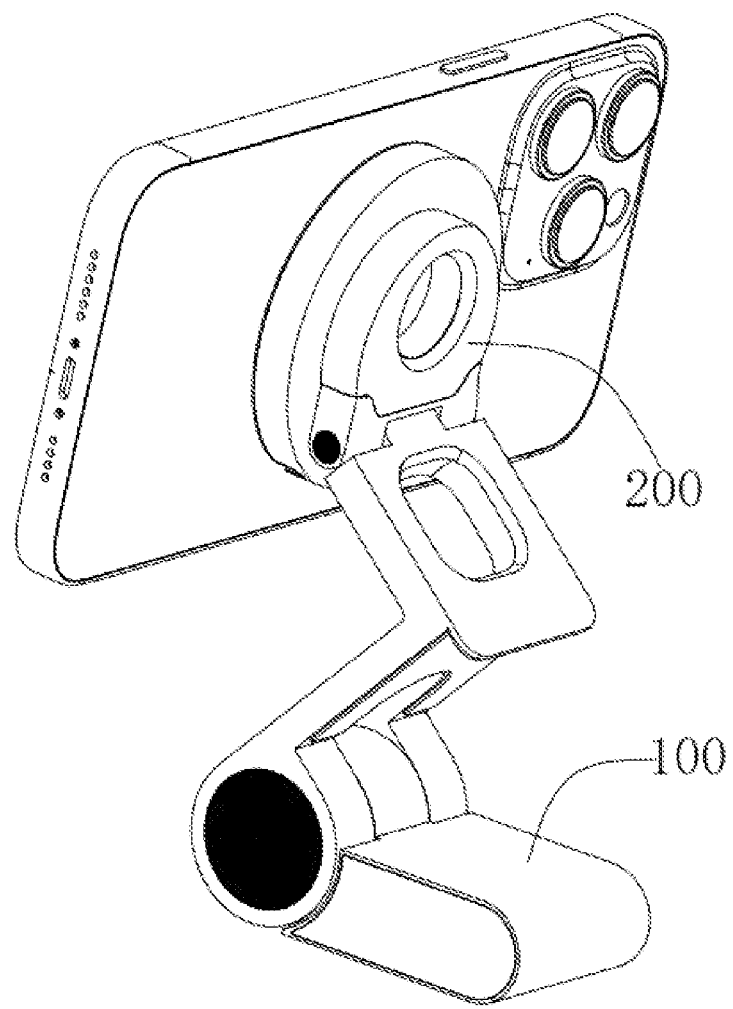
FIG. 4 is a schematic diagram of an entire structure of a magnetic type mobile phone holder in one embodiment.
Figure 5:
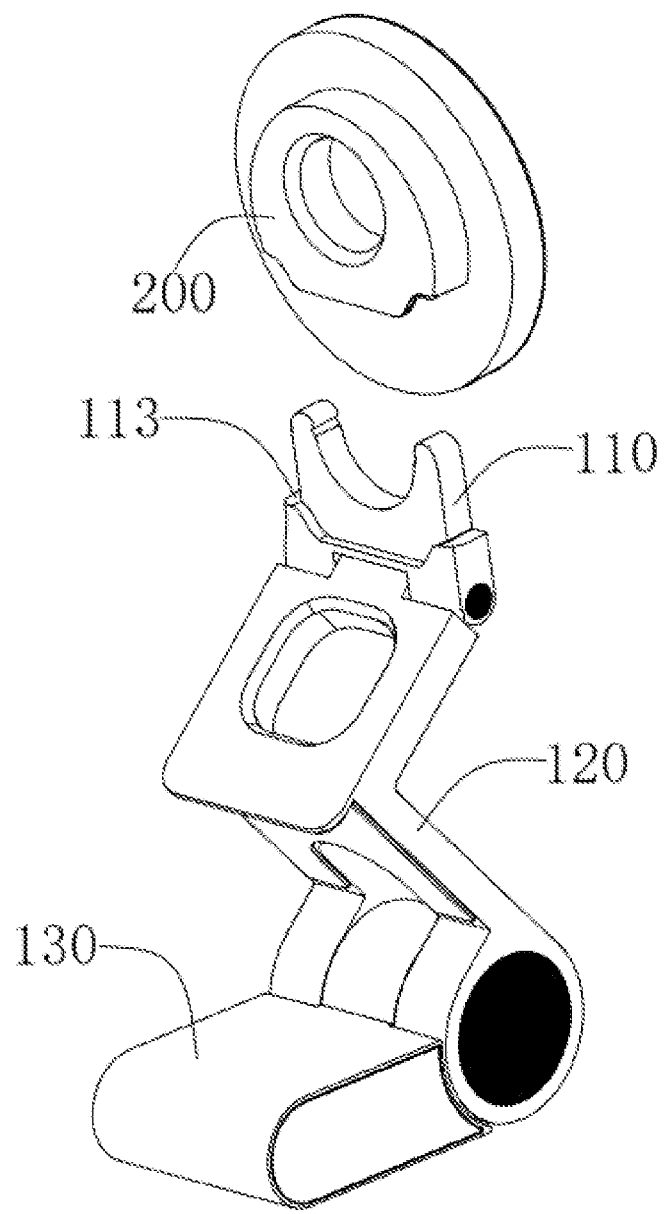
FIG. 5 is an exploded diagram of a magnetic disk holder and a main body holder in one embodiment.

Referring to FIG. 4 and FIG. 5, in one embodiment, the main body holder 100 includes: an upper holder 110, a lower holder 120, a base 130, and a balancing weight 140. Specifically, the balancing weight 140 is arranged inside the base 130. One end of the lower holder 120 is in rotatable fit with the base 130, and the other end is in rotatable fit with one side of the upper holder 110 close to the base 130.

It should be noted that when the main body holder 100 is combined with the magnetic disk holder 200 for use, the rotatable fit between the lower holder 120 and the base 130 is mainly used to adjust a supporting height by the magnetic type mobile phone holder. The rotatable fit between the lower holder 120 and the upper holder 110 is mainly used to adjust a supporting angle by the magnetic type mobile phone holder. By mutual cooperation of the two adjustment manners mentioned above, a demand of a user during use of the mobile phone holder is met.

Of course, when the lower holder 120 rotates relative to the base 130, the supporting angle of the mobile phone holder can also be adjusted. However, the supporting height changes a lot in the rotating process, so that an adjustment height is used as a main adjustment parameter during the rotation of the lower holder 120. Similarly, when the upper holder 110 rotates relative to the lower holder 120, the supporting height of the mobile phone holder can also be adjusted. However, the supporting angle changes a lot in the rotating process, so that an adjustment angle is used as a main adjustment parameter during the rotation of the upper holder 110.

Figure 6:
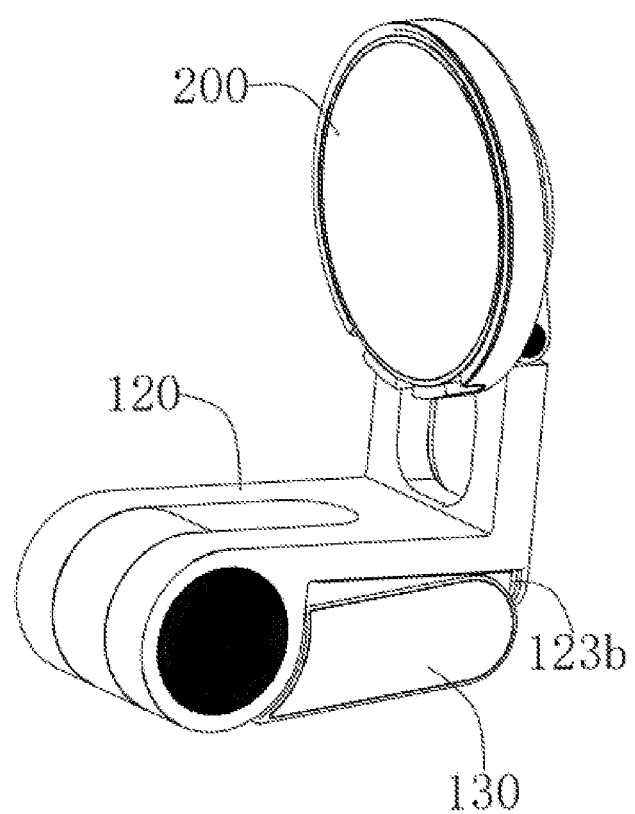
FIG. 6 is a schematic structural diagram of a magnetic type mobile phone holder in one embodiment after folding.

Referring to FIG. 6, in one embodiment, the lower holder 120 and the base 130 can rotate reversely to fold the lower holder 120 towards a side where the base 130 is located, to achieve folding and storage of the magnetic type mobile phone holder. Obviously, in a folded state of the magnetic type mobile phone holder, the upper holder 110 can still rotate relative to the lower holder 120, so that the upper holder 110 is still in a supported state. At this time, the supporting height of the magnetic type mobile phone holder is significantly reduced, which is another use state of the magnetic type mobile phone holder.

Figure 7:
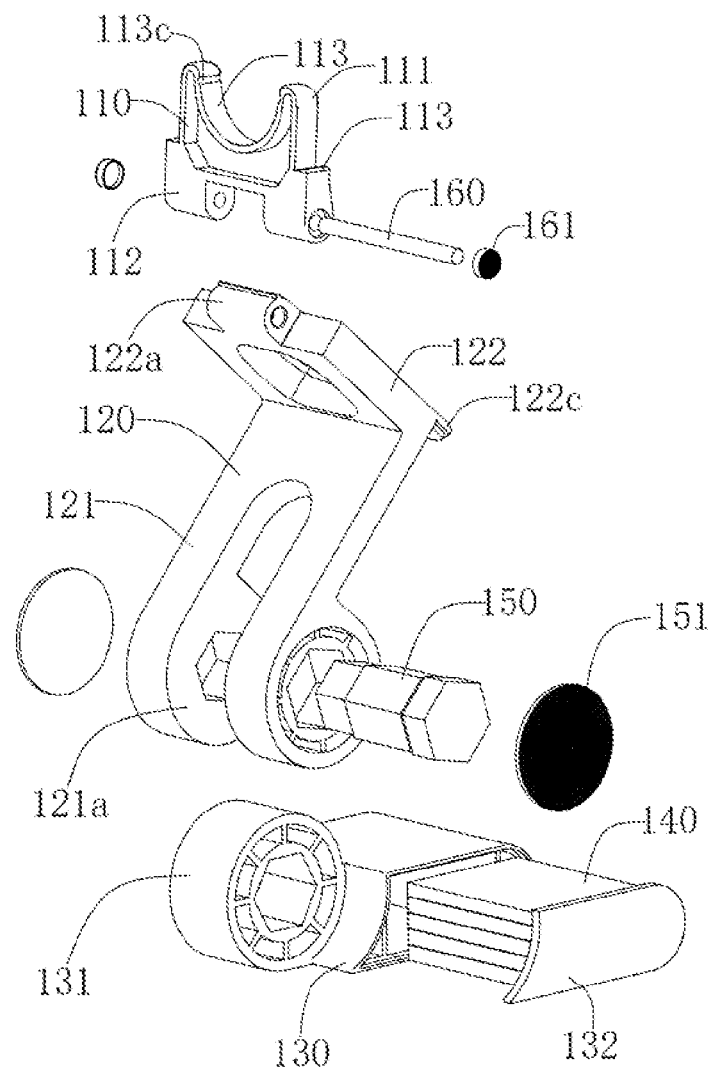
FIG. 7 is an exploded diagram of a main body holder in one embodiment.

Referring to FIG. 5 and FIG. 7. In one embodiment, the upper holder 110 includes a plugging portion 111 and a connecting portion 112. The plugging portion 111 is used for being plugged into the magnetic disk holder 200 and is assembled with the magnetic disk holder 200. The connecting portion 112 is located on one side of the plugging portion 111 away from the magnetic disk holder 200. The connecting portion 112 is used for being in rotatable fit with the lower holder 120.

It should be noted that in this embodiment, the connecting portion 112 and the plugging portion 111 are integrally formed, and a step 113 is formed at connection positions of the connecting portion 112 and the plugging portion 111. In the process of plugging the plugging portion 111 into the magnetic disk holder 200, if the magnetic disk holder 120 resists against the step 113, it indicates that the plugging portion 111 has been plugged to a predetermined position in the magnetic disk holder 200, that is, assembling of the main body holder 100 and the magnetic disk holder 200 is completed.

Continue to refer to FIG. 7, in one embodiment, a first hinge portion 131 is arranged on the base 130. The lower holder 120 includes a first connecting section 121 and a second connecting section 122. The first connecting section 121 is provided with a second hinge portion 121a, and the second hinge portion 121a is in rotatable fit with the first hinge portion 131 through a first rotating shaft 150. The second connecting section 122 is connected to one side of the first connecting section 121 away from the second hinge portion 121a. The second connecting section 122 is in rotatable fit with the upper holder 110 through a second rotating shaft 160.

In one embodiment, the first rotating shaft 150 is provided with first decorative covers 151 at both ends along an axial direction. Correspondingly, the second hinge portion 121a is provided with first accommodating slots (not shown in the figures) matched with the first decorative covers 151.

It is worth noting that in this embodiment, the entire first rotating shaft 150 is in a regular hexagonal prism shape. A hexagonal through hole (not shown in the figures) matched with the first rotating shaft 150 is formed in the second hinge portion 121a. The corresponding first hinge portion 131 is also provided with a hexagonal through hole (not shown in the figures). In this way, when the lower holder 120 rotates relative to the base 130, an angle between the lower holder 120 and the base 130 can be 60 degrees or 120 degrees, which makes supporting more stable. In other embodiments, the first rotating shaft 150 can also be in a regular octagon, a regular dodecagon, and other regular polygons, or the first rotating shaft 150 can be set as a damping rotating shaft, so that it can be stably supported at any position after rotation.

Figure 8:
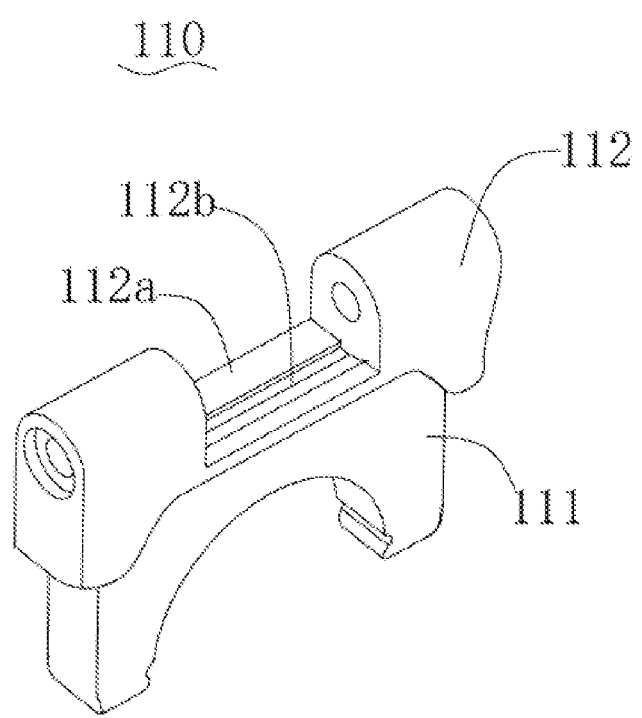
FIG. 8 is a schematic structural diagram of an upper holder in one embodiment.

Referring to FIG. 7 and FIG. 8, in one embodiment, the second connecting section 122 is provided with a hinge end socket 122a on one side close to the upper holder 110. An accommodating slot 112a is formed in one side of the connecting portion 112 close to the lower holder 120. The hinge end socket 122a is accommodated in the accommodating slot 112a, and the second rotating shaft 160 penetrates through the connecting portion 112 and the hinge end socket 122a to achieve rotatable fit between the hinge end socket 122a and the connecting portion 112.

In one embodiment, the second rotating shaft 160 is provided with second decorative covers 161 at both ends along an axial direction. Correspondingly, the first hinge portion 112 is provided with second accommodating slots (not shown in the figures) matched with the second decorative covers 161.

In this embodiment, the entire second rotating shaft 160 is cylindrical, and correspondingly, circular through holes (not shown in the figures) for allowing the second rotating shaft 160 to penetrate are formed in the hinge end socket 122a and the connecting portion 112. In other embodiments, the second rotating shaft 160 can also be set as a damping rotating shaft to ensure that the upper holder 110 stably stays at a position-after-rotation after the upper holder rotates relative to the second connecting section 122, and to ensure the stability of supporting of the upper holder 110 after rotation.

Figure 9:
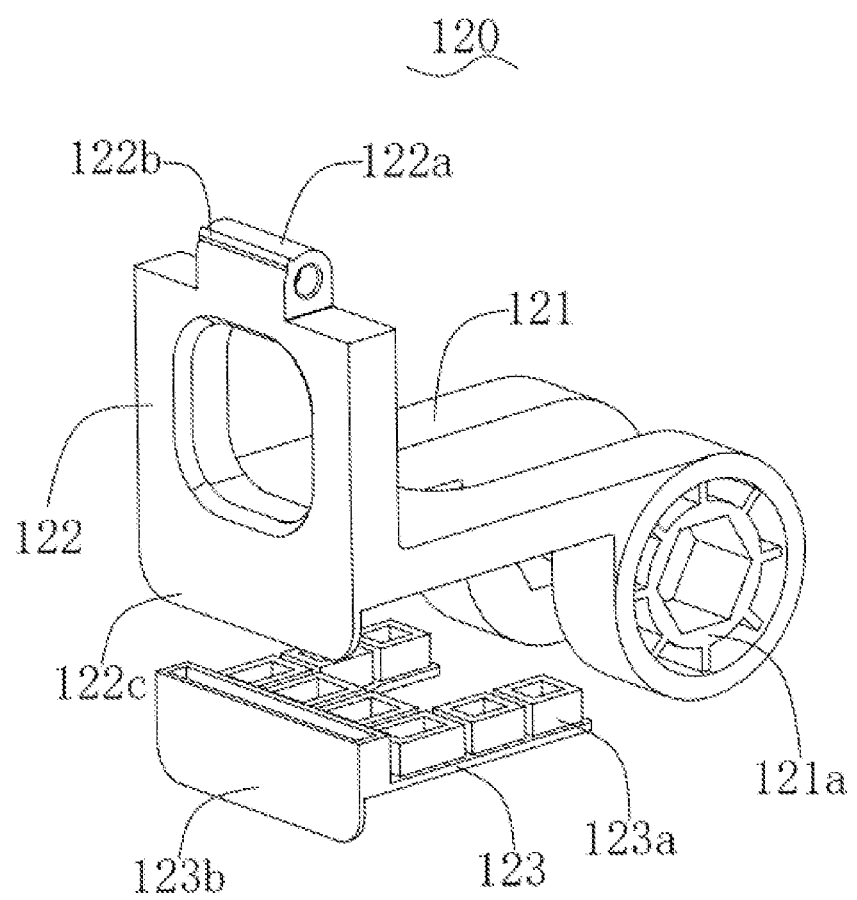
FIG. 9 is an exploded diagram of a lower holder in one embodiment.

Continue to refer to FIG. 8 and FIG. 9, in one embodiment, an abutment strip 122b is arranged on an outer side wall of the hinge end socket 122a in a raised manner. An inwards sunken abutment slot 112b is formed in a bottom of the accommodating slot 112a. Mutual cooperation between the abutment slot 112b and the abutment strip 122b can effectively prevent excessive rotation between the hinge end socket 122a and the connecting portion 112, thereby limiting an angle of rotation between the upper holder 110 and the lower holder 120.

In one embodiment, the abutment strip 122b can abut against a side wall of the accommodating slot 112a, thereby effectively preventing excessive rotation between the hinge end socket 122a and the connecting portion 112. This solution can avoid formation of an abutment slot 112b in an inner wall of the accommodating slot 112a.

In other embodiments, a raised abutment strip is arranged at a bottom of the accommodating slot 112a, and an inwards sunken limiting slot is formed in an outer side wall of the hinge end socket 122a. In this way, when the hinge end socket 122a rotates relative to the connecting portion 112, the abutment strip located in the accommodating slot 112a can only move within the limiting slot, thereby achieving an effect of preventing excessive rotation.

Return to FIG. 9, in one embodiment, the first connecting section 121 and the second connecting section 122 are integrally formed, and the first connecting section 121 is perpendicular to the second connecting section 122. A first abutment portion 122c is arranged on one side of the second connecting section 122 away from the hinge end socket 122a, and the first abutment portion 122c is perpendicular to the first connecting section 121.

Referring to FIG. 1 to FIG. 3, FIG. 5, and FIG. 7, it should be noted that to combine the magnetic type mobile phone holder with the display equipment 300, the mobile phone holder can be hung to the display equipment 300. The first abutment portion 122c arranged on the lower holder 120 abuts against one end surface of the display equipment 300, and the balancing weight 140 inside the base 130 leans against the other end surface of the display equipment 300 under the action of the gravity. The lower holder 120 is forced to press tightly against a side wall of the display equipment under the gravity of the balancing weight 140, causing the first abutment portion 122c to resist against the end surface of the display equipment 300 for fixation, thereby achieving the combination between the mobile phone holder and the display equipment 300.

Referring to FIG. 1, FIG. 5, and FIG. 7, for example, to combine the magnetic type mobile phone holder with a display screen of Apple iMac, the first abutment portion 122c arranged on the lower holder 120 abuts against a display end surface of the display screen of Apple iMac, and the base 130 leans against a rear wall surface of the display screen of Apple iMac under the gravity of the balancing weight 140 inside. Under the gravity of the balancing weight 140, the first connecting portion 121 is forced to be loaded and pressed on a side wall of the display screen of Apple iMac, thereby combining the magnetic type mobile phone holder with Apple iMac for use. Since the display screen of Apple iMac has an angle adjustment function, during the adjustment of an angle of the display screen of Apple iMac, the magnetic type mobile phone holder can also support and fix the mobile phone at a desired position by adjusting a clamping angle between the lower holder 120 and the base 130, so that the mobile phone can be combined with the display screen of Apple iMac for use.

Referring to FIG. 2, FIG. 5, and FIG. 7, for example, to combine the magnetic type mobile phone holder with a display screen of Apple macbook, the first abutment portion 122c abuts against a display end surface of the display screen of Apple macbook, and the base 130 leans against a back surface of the display screen of Apple macbook under the action of the balancing weight 140 inside. Under the gravity of the balancing weight 140, the first connecting portion 121 is forced to be loaded and pressed on a side wall of the display screen of Apple macbook, thereby combining the magnetic type mobile phone holder with Apple macbook for use. However, in general, due to decreasing resistance of rotation between the display screen of Apple macbook and a keyboard rotation as the display screen is used, it is difficult to adjust the display screen of Apple macbook to an appropriate angle of use under the gravity of the balancing weight 140. Therefore, referring to FIG. 3, the magnetic disk holder 200 of the magnetic type mobile phone holder can be removed from the main body holder 100 and used directly in conjunction with the display screen of Apple macbook, for ease of use.

It should be noted that Apple iMac and Apple macbook only refer to two kinds of terminal devices of the brand of Apple and have no other special meanings.

Referring to FIG. 9, in one embodiment, the lower holder 120 also includes a flexible protective member 123. The flexible protective member 123 is connected to the first connecting section 121. Specifically, the lower holder 120 is provided with an insertion slot (not shown in the figures), and the flexible protective member 123 is provided with an insert 123a. The insert 123a is inserted into the insertion slot and is fixed in the insertion slot under the elastic action of the flexible protective member 123 itself, thereby fixedly mounting the flexible protective member 123 on the lower holder 120.

It should be noted that the flexible protective member 123 is provided with an end portion 123b that is matched with the first abutment portion 122c. When an end surface of the first abutment portion 122c close to one side of the second hinge portion 121a is in contact with the display equipment 300, the end portion 123b can protect the display equipment 300 and effectively prevent collision between the first abutment portion 122c and the display equipment 300.

Referring to FIG. 6 and FIG. 9, in one embodiment, when the lower holder 120 and the base 130 are in a folded state, the flexible protective member 123 is located between the lower holder 120 and an upper end surface of the base 130, which can effectively prevent collision or friction between an end surface of the lower holder 120 and the upper end surface of the base 130.

In one embodiment, both the first connecting section 121 and the second connecting section 122 are provided with hollowed structures (not shown in the figures). In this way, the weight of the lower holder 200 can be effectively reduced, and the portability of the mobile phone holder is guaranteed.

Return to FIG. 7, in one embodiment, the base 130 has an internal cavity. The balancing weight 140 is mounted in the cavity, and a third decorative sheet 132 is arranged on one side of the base 130. The third decorative sheet 132 is used for being assembled with the base 130, thereby closing the internal cavity on the base 130.

Figure 10:
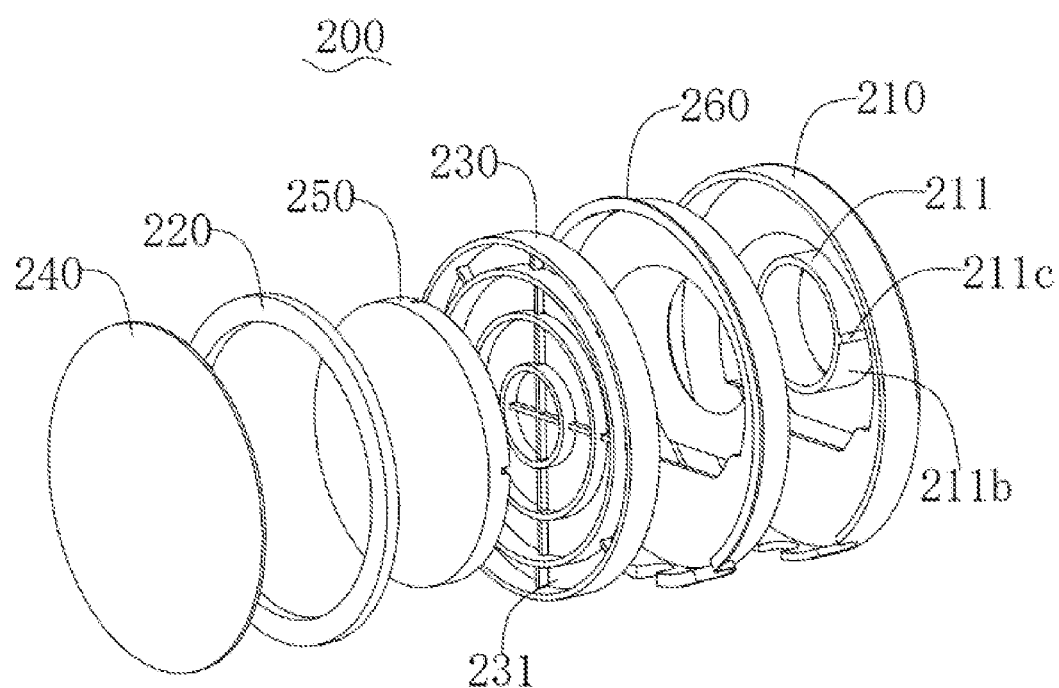
FIG. 10 is an exploded diagram of a magnetic disk holder in one embodiment.
Figure 11:
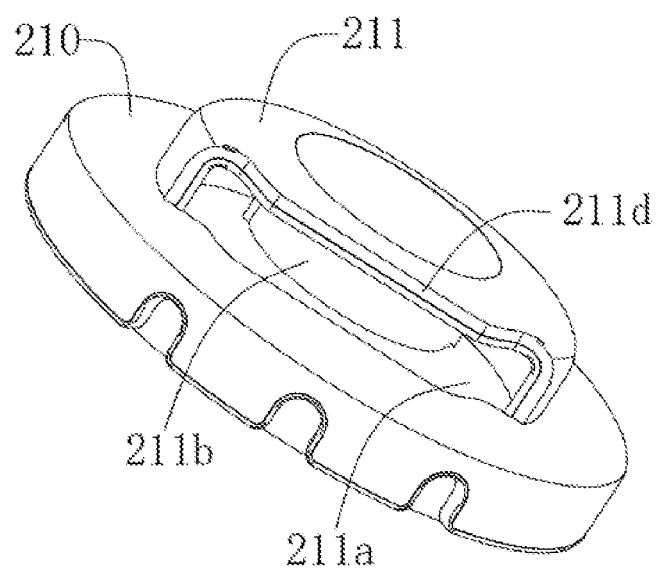
FIG. 11 is a schematic structural diagram of an outer shell in one embodiment.

Referring to FIG. 5, FIG. 10, and FIG. 11, in one embodiment, the magnetic disk holder 200 includes an outer shell 210 and a magnetic piece 220. Specifically, a bulge structure 211 is arranged on one side of the outer shell 210 away from the mobile phone, and the bulge structure 211 extends towards one side away from the mobile phone. A plugging port 211a is formed in a side wall of the bulge structure 211. A connecting portion 211b is arranged in the bulge structure 211, and the connecting portion 211b extends to the side with the magnetic piece 220. The upper holder 110 is plugged into the plugging portion 211a and is assembled with the connecting portion 211b, thereby achieving detachable fit between the upper holder 110 and the magnetic disk holder 200. The magnetic piece 220 is mounted on one side, away from the bulge structure 211, in the outer shell 210. In this embodiment, the bulge structure 211 and the outer shell 210 are integrally formed. The magnetic piece 220 is a magnet.

Referring to FIG. 7 and FIG. 11, in one embodiment, a connecting slot 113 is formed in one side of the plugging portion 111 close to the connecting portion 211b, and the connecting slot 113 is used for accommodating the plugging portion 111. It is worth noting that a recess 113c is formed in a side wall of the connecting slot 113b, and a fixture block 211c is arranged on an outer side wall of the connecting portion 211b in a raised manner. The fixture block 211c is matched with the recess 113c, thereby further fixing the connecting portion 211b and the plugging portion 111 in a detachable manner.

In other embodiments, a fixture block is arranged on a side wall of the connecting slot 113b, and a recess matched with the fixture block is arranged on a side wall of the connecting portion 211b. Or, there are two fixture blocks, one of which is located on an outer side wall of the connecting slot 113b and the other one of which is located on an outer side wall of the connecting portion 211b. There are two corresponding recesses.

In one embodiment, a second abutment portion 211d is arranged on an end surface of the bulge structure 211 located on one side of the plugging port 211a, and the second abutment portion 211d is parallel to an attractive end surface of the magnetic disk holder 200. When the magnetic disk holder 200 is assembled with a display screen of external digital equipment, the second abutment portion 211d is used to abut against the display screen, thereby ensuring the stability of combination between the magnetic disk holder 200 and the display screen.

Figure 12:
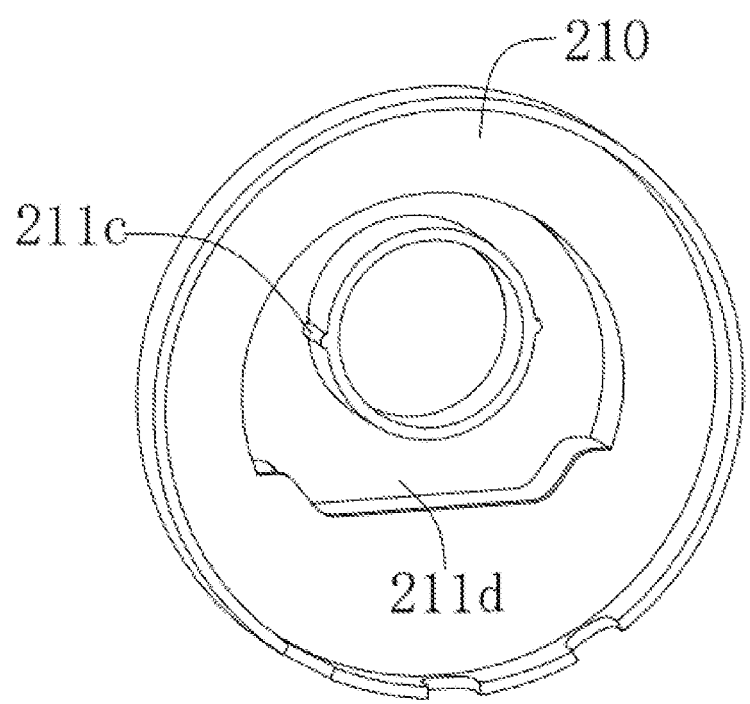
FIG. 12 is a schematic structural diagram of an outer shell in another embodiment.

Referring to FIG. 10, FIG. 11, and FIG. 12, in one embodiment, the magnetic disk holder 200 further includes a supporting member 230, an abutting sheet 240, and a filling member 250. The supporting member 230 is accommodated inside the outer shell 210, and an annular slot 231 is formed in one side of the supporting member 230 away from the bulge structure 211. The magnetic piece 220 is annular and is embedded in the annular slot 231. The abutting sheet 240 is located on an attractive side of the magnetic piece 220, and the abutting sheet 240 is bonded and fixed with the magnetic piece 220. The filling member 250 is mounted in a center of the supporting member 230, and the filling member 250 and the supporting member 230 are in clamping fit. The clamping fit is the prior art, which will not be described in detail here. Due to the arrangement of the supporting member 230 and the filling member 250, the outer shell 210 can be internally filled completely, so as to ensure that the magnetic disk holder 200 can be used normally.

In other embodiments, the magnetic disk holder 200 further includes a flexible member 260. The flexible member 260 is located inside the outer shell 210 and completely covers an inner wall surface of the outer shell 210. When the plugging portion 111 is plugged into the plugging port 211a, the flexible member 260 can protect the plugging portion 111 while improving the tightness of combination between the plugging portion 111 and the plugging port 211a.

In other embodiments, there are three notches in a side wall of the outer shell 210, and there are three notches correspondingly formed in the flexible member 260. The supporting member 230 and the filling member 250 can be replaced with a wireless charging device, so that the magnetic disk holder 200 has a wireless charging function. Due to the arrangement of the three notches, it is convenient to connect an external power line to the wireless charging device. It should be noted that in this embodiment, the wireless charging device is an Apple MagSafe wireless charging device.

The above is only used to explain the technical solution of the present disclosure, but not to limit the technical solution. Other modifications or equivalent substitutions made by those of ordinary skill in the art to the technical solution of the present disclosure shall fall within the scope of the claims of the present disclosure without departing from the spirit and scope of the technical solution of the present disclosure.

What is claimed is:

1. A novel magnetic type mobile phone holder, comprising:
a base, wherein a balancing weight is arranged in the base;
a lower holder, wherein one end of the lower holder is in rotatable fit with the base;
a first abutment portion is arranged on the lower holder; the first abutment portion cooperates with the base to fix the mobile phone holder to display equipment;
an upper holder, wherein the upper holder is in rotatable fit with one side of the lower holder away from the base; and
a magnetic disk holder, wherein the magnetic disk holder is detachably fitted to one side of the upper holder away from the lower holder; and when the magnetic disk holder is separated from the upper holder, the magnetic disk holder can be independently connected to the display equipment to connect a mobile phone fixed on the magnetic disk holder to the display equipment,
wherein the lower holder comprises a first connecting section and a second connecting section connected to one side of the first connecting section away from the base; the first connecting section is perpendicular to the second connecting section; the first abutment portion is located at connection positions of the first connecting section and the second connecting section; the first abutment portion protrudes from the second connecting section and extends towards one side away from the upper holder; and the first abutment portion is perpendicular to the first connecting section.

2. The novel magnetic type mobile phone holder according to claim 1, wherein a first hinge portion is arranged at one end of the base; a second hinge portion is arranged on one side of the first connecting section away from the second connecting section; and the upper holder is in rotatable fit with the base through the first hinge portion and the second hinge portion.

3. The novel magnetic type mobile phone holder according to claim 1, wherein a hinge end socket is arranged on one side of the second connecting section away from the first connecting section; a hinge slot is formed in one side of the upper holder close to the second connecting section; and the hinge end socket is plugged into the hinge slot and is in rotatable fit through a first rotating shaft.

4. The novel magnetic type mobile phone holder according to claim 2, wherein the lower holder further comprises a flexible protective member; the flexible protective member is connected to the first connecting section and is located between the first connecting section and an upper end surface of the base; and one side of the flexible protective member away from the second hinge portion is connected to the first abutment portion.

5. The novel magnetic type mobile phone holder according to claim 1, wherein an end surface of the magnetic disk holder connected to the mobile phone is a connecting end surface; and the magnetic disk holder comprises: an outer shell, wherein a bulge structure is arranged on one side of the outer shell away from the connecting end surface; the bulge structure extends towards one side away from the connecting end surface; a plugging port is formed in a side wall of the bulge structure; the display equipment is connected to the plugging port to achieve connection between the magnetic disk holder and the display equipment; and a magnetic piece, wherein the magnetic piece is mounted on one side, away from the bulge structure, in the outer shell.

6. The novel magnetic type mobile phone holder according to claim 5, wherein a connecting portion is arranged in the bulge structure; the connecting portion extends to one side of the magnetic piece; and the upper holder is threaded into the plugging port and is in detachable fit with the connecting portion.

7. The novel magnetic type mobile phone holder according to claim 6, wherein a plugging portion is arranged on one side of the upper holder close to the plugging port; a connecting slot matched with the connecting portion is formed in one side of the plugging portion close to the connecting portion; a recess is formed in a side wall of the connecting slot; a fixture block matched with the recess is arranged on an outer side wall of the connecting portion in a raised manner; and/or, a recess is formed in an outer side wall of the connecting portion, and a fixture block matched with the recess is arranged on a side wall of the connecting slot in a raised manner.

8. The novel magnetic type mobile phone holder according to claim 5, wherein an abutment portion is arranged on an end surface of the bulge structure located on one side of the plugging port; and the abutment portion is parallel to an attractive end surface of the magnetic disk holder.

9. The novel magnetic type mobile phone holder according to claim 5, wherein the magnetic disk holder further comprises: a supporting member, wherein the supporting member is accommodated in the outer shell; an annular slot is formed in one side of the supporting member away from the bulge structure; the magnetic piece is embedded in the annular slot; and an abutting sheet, wherein the abutting sheet is located on an attractive side of the magnetic piece and is connected to the magnetic piece.

* * * * *